Aug. 6, 1940.   M. MUKER   2,210,769
STRINGER FOR VEGETABLES AND THE LIKE
Filed March 19, 1938
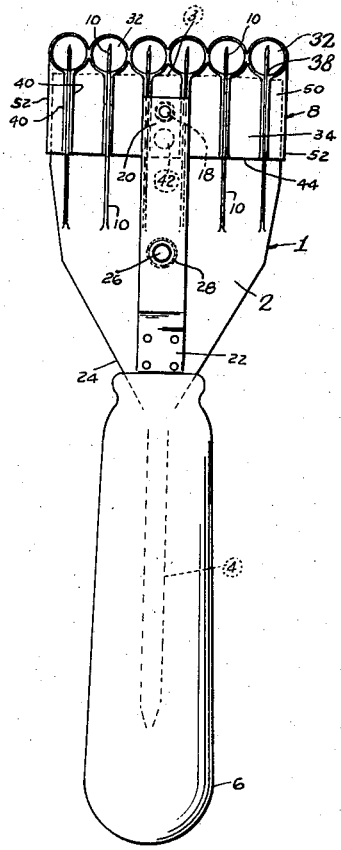
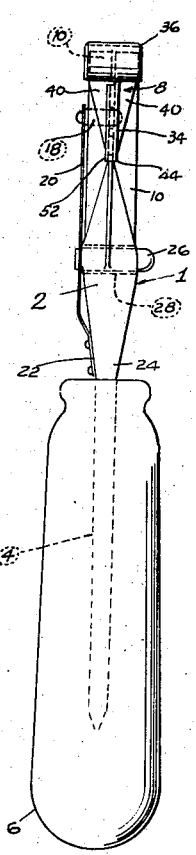
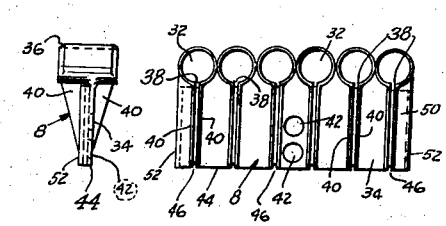
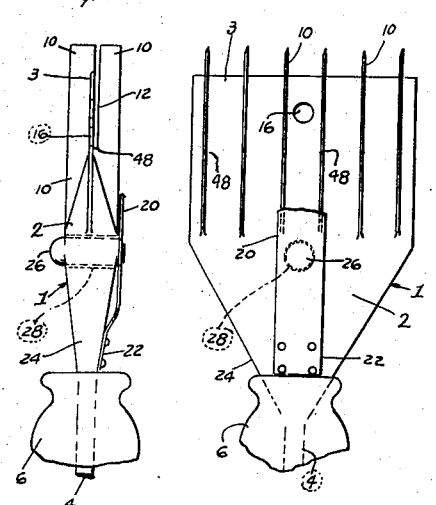
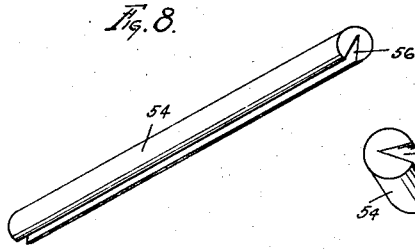
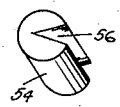
INVENTOR
Martin Muker Patented Aug. 6, 1940

2,210,769

UNITED STATES PATENT OFFICE 2,210,769

STRINGER FOR VEGETABLES AND THE LIKE

Martin Muker, Long Beach, Calif.

Application March 19, 1938, Serial No. 196,927

5 Claims. (Cl. 30—279)

My invention relates to culinary tools generally called vegetable stringers, and more particularly to a device for cutting string like pieces from edible tuber or plant roots, such as potatoes, carrots, turnips, beets or the like, and is also adapted for cutting or chopping vegetables and fruits into small cubes or pieces to be used for making salads or the like.

One of the objects of my invention is to provide a culinary tool that includes a plurality of tubular cutting members preferably provided with sharpened cutting edges at each end thereof, so that either end will perform a cutting function for cutting plant roots into a plurality of string like pieces, much like the well known shoe string potatoes.

A further object of my invention is to provide a culinary tool that includes a section having a plurality of tubular cutting members and being associated with a handled body section that includes a knife plate having a flat blade for each tubular cutting member, the blades being arranged axially within the cutting members for cutting longitudinal slits along the pieces cut by the tubular members, and said slits not only provide guiding means for splitting said pieces, into thin and narrow parts, but the pieces may be retained whole, and in that event the slits expedite the cooking thereof, in that the slits provide a greater exterior surface for the action of heat.

Another object of my invention is to provide what I term a string cutting tool that includes a tubular cutting member section mounted on the knife plate of the body section for adjustment of the tubular cutting members with respect to the blades of the knife plate, to allow cutting of said slits at any desired depth, or the tubular cutting member section may be arranged with respect to the knife plate, so that the tubular cutting members can be used without the blades, and in that event the pieces cut will be free from the slits.

Another object of my invention is to provide a culinary tool with a removable tubular cutting element section, so that the tool can be used without that section for chopping and cutting the vegetables, with the flat blades of the body section.

A further object of my invention is to provide a culinary tool, that is simple in construction, inexpensive to manufacture, easy to sharpen and extremely efficient in use, operation and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a front elevation of the tool which forms the subject matter of the present invention.

Figure 2 is a side elevation thereof.

Figure 3 is a front view of the tubular cutting member section.

Figure 4 is a side view thereof.

Figure 5 is a fragmentary front view of the handled body section.

Figure 6 is a side view thereof.

Figure 7 is a view illustrating the knife plate and blades thereof, of the body section.

Figure 8 is a perspective view of a string piece of fruit or vegetable cut by my tool when completely assembled as shown in Figures 1 and 2.

Figure 9 is a perspective view of a piece cut from the string piece, by the flat cutting blades of the body section.

Referring to the drawing in detail, it will be noted that the body section which is broadly indicated by the reference numeral 1 includes an enlarged portion 2 that decreases in thickness from its transverse center to its ends and has secured thereto and extending outwardly from its outer end a knife plate 3, while formed on or otherwise secured to its inner end is a shank 4 mounted within and secured to a handle 6.

The knife plate 3 which provides the mounting means for detachably and slidably receiving the tubular cutting member section broadly indicated by the reference numeral 8, has fixed thereto a plurality of thin cutting blades 10 that are disposed at right angles thereto and extend from the enlarged portion 2, for disposal along the entire length of the plate 3, as well as outwardly beyond the outer edge thereof, as best shown in Figure 5. The side edges of the blades 10, as well as the outer end edges may be beveled to provide cutting edges, but in any event each of the blades 10 is provided with a longitudinally disposed slot 12, the purpose of which will be later described.

Disposed midway between the side edges of the plate 3 and adjacent to the outer edge thereof is a hole 16 for the purpose of receiving a plug member 18 that is fixed to the free end of a resilient strip member 20, in the form of a leaf spring as shown, and which has its opposite end fixed as at 22 to the hilt 24 of the body section, as best shown in Figure 1. The plug member 18 is of course for the purpose of securing the tubular cutting member section 8 to the plate 3, and in order to manipulate the plug member, the resilient member 20 is provided with an elongated push button 26 mounted for slidable movement through a bore 28 extending transversely of the enlarged portion 2, as best shown in Figure 2. By that construction, it will be obvious that when pressure is applied to the free end of the push button 26, the plug member 18 will be moved out of the hole 16, to allow removal of the tubular cutting element section 8 from the plate, or for adjustment thereon for a purpose which will be later described.

The tubular cutting members of the section 8 are indicated by the reference numeral 32 and are formed on and along the outer edge of a substantially rectangular plate 34, for disposal at right angles thereto and fixed to each other in side by side relation. Each of said members 32 have their outer ends beveled to provide cutting edges 36 and each is likewise slotted as at 38 along the length thereof to receive therein the cutting blades 10, when the section 8 is mounted on the plate 3, as will be apparent upon inspection of Figure 1.

Cooperating with the plug member 18 for securing the section 8 to the plate 3 against endwise movement are pairs of ribs 40 disposed on each side of the rectangular plate 34 and extending from the slots 38 to provide guideways for slidably receiving the blades 10 therein, as clearly shown in Figure 1. The ribs 40 which are of triangular formation in the form shown, extend for the entire width of the plate 34 and have their wide ends formed on the tubular cutting members, as best shown in Figure 3, and in applying the section 8 to the plate 3, it will be obvious that the portion of the plate 34 between the ribs are received in the slots 12 of the blades 10, for disposal of the ribs upon opposite sides of each of the blades, as will be apparent upon inspection of Figure 1.

The plate 34 is provided with a pair of openings or holes 42 arranged so that either one thereof will register with the hole 16, to receive the plug member 18, to not only detachably secure the section 8 to the plate 3, but also to hold the same in adjusted positions thereon. The holes 42 are shown as being arranged so that when the plug member 18 is positioned in the outer hole 42, as shown in Figures 1 and 2, the blades 10 will be disposed within the tubular cutting members along the longitudinal axis thereof for approximately two-thirds of their diameters, for cutting slits in the pieces cut by the tubular members accordingly, as clearly shown in Figures 8 and 9, and which is of the preferred depth. However, the outer hole 42 may be arranged in a different position or additional holes may be provided to vary the distance of the blades 10 within the tubular cutting members. In any event, when the section 8 is adjusted for the disposal of the plug member within the inner hole 42, the blades 10 will be arranged out of the tubular cutting members 32, so that the latter can be used to cut string like pieces without the slits therein.

The edge 44 of the plate 34 between the ribs, is preferably recessed as at 46 to provide seats for receiving the inner edges 48 of the slots 12, to cooperate with the ribs 40 to prevent endwise movement of the section 8 on the plate 3.

The side edges of the plate 34 are turned in to provide channel guards 52 for disposal about the side edges of the plate 3 and that feature not only likewise prevents endwise movement of the section 8 on the plate 3, but covers the side edges of the plate 3 to prevent accidental injury to the user as will be apparent.

In the use of my tool, and assuming that the tubular cutting member section is positioned on the body section so that the blades 10 extend into the tubular cutting members, as shown in Figures 1 and 2, it is believed that it will be obvious that when the tool is drawn through a piece of fruit or a vegetable, that the cutting edges 36 will cut string like pieces 54 having slits 56 along the length thereof, as shown in Figure 8. While the cutting blades 10 do not actually cut the slit 56 in the cross sectional wedge shape configuration of Figure 8, the slit will assume that shape almost immediately after being cut, especially in certain types of vegetables, such as potatoes, carrots, or the like. When it is desired to cut the string like pieces 54, into smaller pieces as shown in Figure 9, the tubular cutting member section 8 is removed from the body section and the blades 10 are used for that purpose, as will be apparent. It will be further obvious that the blades 10 can be used for chopping and mincing fruits and vegetables without first cutting the same into the pieces 54, and either the sides or the projecting ends of the blades may be used to perform the chopping function.

While the cutting elements 32 are shown as being of tubular formation, they may be of any shape, such as for example square or triangular in cross section to cut the string like pieces 54 accordingly, with the slits 56 arranged therein, as the slits are very important in that they may be used as guides for splitting the pieces 54 if desired, but when the pieces are retained whole, the slits 54 provide an additional surface to be exposed to the action of heat, thus materially expediting cooking, frying or otherwise preparing the pieces for human consumption, and such expeditious cooking action tends to retain all of the flavor and nutritious elements within the pieces, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A tool for cutting and stringing fruits and vegetables, comprising a handled body section including a plate, blades secured to said plate for disposal at right angles thereto and having end portions extending beyond an edge of said plate, and a section including tubular cutting members and mounted on the plate with the extending end portions of said blades disposed within and along the longitudinal axis of the tubular cutting members.

2. A tool for cutting and stringing fruits and vegetables, comprising a handled body section including a plate, blades secured to said plate for disposal at right angles thereto and having end portions extending beyond one edge of said plate, a section including tubular cutting members and mounted on the plate for the disposal of the extending end portions of said blades within and along the longitudinal axis of the tubular cutting members, the latter section being adjustable to vary the position of said extending end portions with respect to the tubular cutting members, and means for securing the adjustable section in adjusted positions.

3. A tool for cutting and stringing fruits and vegetables, comprising a handled body section including a plate having a hole therein, blades secured to said plate for disposal at right angles thereto and having end portions extending beyond one edge of said plate, a section including tubular cutting members and detachably mounted on the plate for the disposal of the extending end portions of said blades within and along the longitudinal axis of the tubular cutting members, the latter section being adjustable to vary the position of said extending end portions with respect to the tubular cutting members and having holes therein for the disposal of any one thereof in registration with the hole of the plate, spring means having one end fixed to the body section, and means on the opposite end of the spring means and receivable in the registering holes for securing the adjustable section in adjusted positions.

4. A tool for cutting and stringing fruits and vegetables, comprising a handled body section including a plate, blades secured to said plate for disposal at right angles thereto and having end portions extending beyond an edge of said plate, said blades being arranged in parallelism and in equidistantly spaced relation to each other, said blades being slotted longitudinally from their outer ends for a portion of their length, a section associated with the first section and likewise including a plate, a plurality of tubular cutting members secured to the second plate in row formation and being slotted longitudinally throughout the length thereof, ribs arranged in pairs and secured to the tubular cutting members to extend from the slots thereof for disposal at right angles to the opposite faces of the second plate, said second plate being adjustably mounted in the slots of said blades, with the blades mounted between the ribs for the disposal of the extending end portions of said blades within and along the longitudinal axis of the tubular cutting members, and means for detachably securing the second section to the body section and in adjusted positions thereon.

5. A tool for cutting and stringing fruits and vegetables, comprising a handled body section including a plate having a hole therein, blades secured to said plate for disposal at right angles thereto and having end portions extending beyond an edge of said plate, said blades being arranged in parallelism and in equi-distantly spaced relation to each other, said blades being slotted longitudinally from their outer ends for a portion of their length, a section associated with the first section and likewise including a plate, a plurality of tubular cutting members secured to the second plate in row formation and being slotted longitudinally throughout the length thereof, ribs arranged in pairs and secured to the tubular cutting members to extend from the slots thereof for disposal at right angles to the opposite faces of the second plate, said second plate being adjustably mounted in the slots of said blades with the blades mounted between the ribs for the disposal of the extending end portions of said blades within and along the longitudinal axis of the tubular cutting members, said second plate having its side edges bent to provide guards for disposal about the side edges of the first plate, said second plate having holes therein for disposal of any one thereof in registration with the holes of the first plate, spring means having one end fixed to the body section, and means secured to the opposite end thereof and receivable in the registering holes for securing the second section to the body section and in adjusted positions thereon.

MARTIN MUKER.